W. JOSLIN.
Grinding Mill.
No. 28,989.  Patented July 3, 1860.
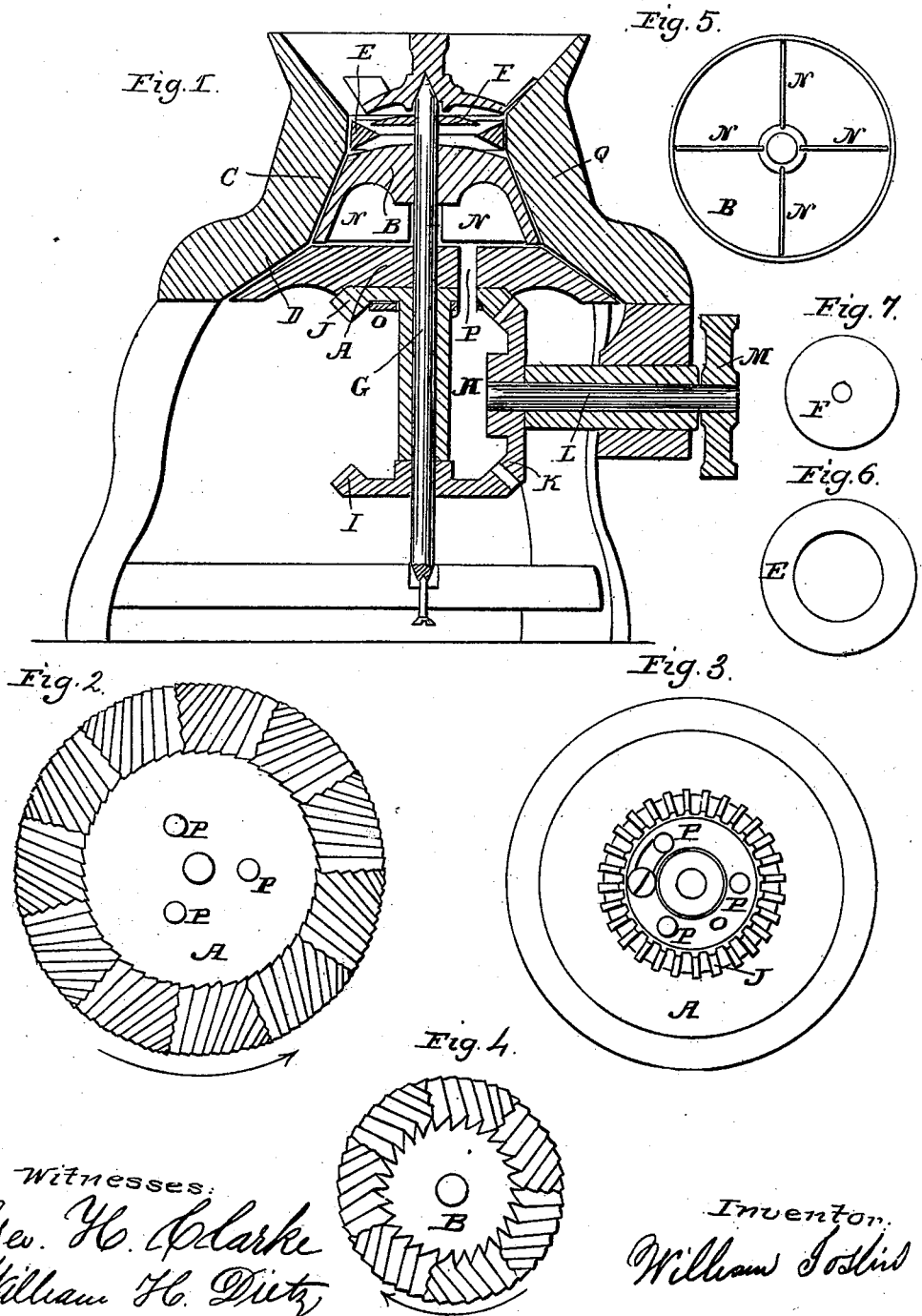

UNITED STATES PATENT OFFICE.

WILLIAM JOSLIN, OF CLEVELAND, OHIO.

MILL.

Specification of Letters Patent No. 28,989, dated July 3, 1860.

*To all whom it may concern:*

Be it known that I, WILLIAM JOSLIN, of Cleveland, in the county of Cuyahoga and State of Ohio, have invented new and useful Improvements in Mills for Grinding Grain and other Substances; and I do hereby declare that the following is a full and exact description thereof, reference being had to the accompanying drawings and to the letters of reference marked thereon.

The nature of my invention consists of a reverse operation of grinding, also of blowing air into the grain, between the reverse grinders after the grain is partly ground and a selfregulating feed ring and hopper bottom, which is described as follows, reference being had to the annexed drawings of the same, making part of this specification:

Figure 1 is a sectional elevation, taken through the center of the mill. Fig. 2 is a top view of the lower runner A, in Fig. 1. Fig. 3 is a bottom view of the lower runner A, in Fig. 1. Fig. 4 is a top view of the upper runner B, in Fig. 1. Fig. 5 is a bottom view of the upper runner B, in Fig. 1. Fig. 6 is a top view of the selfregulating feed ring E, in Fig. 1. Fig. 7 is a top view of the hopper bottom F, in Fig. 1.

G in Fig. 1, is a vertical shaft in the center of the mill, to which the bevel cog wheel I, and upper runner B, is fastened.

J in Fig. 1, is a bevel cog wheel fastened to the lower runner A, said wheel having a projecting sleeve H, through which the shaft G revolves.

K is a bevel cog wheel fastened to the horizontal shaft L. The cog wheel K meshes into the upper cog wheel J, which is fastened to the lower runner A, also into the lower cog wheel I which is fastened to the shaft G with upper runner B. By this arrangement it will be seen that the runner is separated or divided into two parts, having a reverse motion to each other, the reverse motion being produced by the arrangement of the bevel cog wheels I, J, and K, as described.

M, in Fig. 1, is a pulley fastened to the horizontal shaft L, to which the power is applied.

N, N, N, N, in Fig. 5 gives a bottom view of the fans which force the air out between the upper and lower runners, as represented by N, N, in the upper runner B, in Fig. 1.

P, P, P, in Fig. 2 are holes in the lower runner A, for admitting the air to pass up into the vacancies of the upper runner B, to be forced out by the fans N, N, N, N, and mixed with the grain on its passage from the upper runner B, where it is partly ground, to the lower runner A, where it is finished fine and even, by a reverse grinding.

O, in Fig. 1, and O, in Fig. 3 is a circular plate fastened to the under side of the lower runner A, with holes P, P, P, corresponding to holes P, P, P, in the lower runner A. The plate O, is fastened to the lower runner A, by means of a set screw, working through a slot in the circular plate O for regulating the passage of air through the holes P, P, P, in lower runner A, by sliding the plate O, around so as to close the holes in the lower runner A, thereby admitting more or less air into the grain, during the process of grinding.

E, in Fig. 6 is a top view of the selfregulating feed ring.

E in Fig. 1 is a sectional view of the selfregulating feed ring.

F in Fig. 7 is a top view of the hopper bottom.

F, in Fig. 1 is a sectional view of the hopper bottom, fastened to the shaft G, so as to be moved up or down, or it may be fastened to the bridge tree that supports the upper end of the shaft G. The object of this arrangement is to cause a regular amount of grain to pass between the movable hopper bottom F and the V-shaped ring E, to the top of the upper runner B, from thence between the V-shaped ring E, and the upper runner B, to the grinding surfaces between the upper runner B, and the stationary grinding surface C, from thence to the lower reverse grinding surface in the lower runner A, and stationary grinding surface D. The ring E is made so as to move freely up or down between the hopper bottom F, and the upper runner B, and at the same time does not let the grain pass between the ring E, and outside stationary part of the mill. It will be seen by this arrangement that if too much grain gets between the upper runner B, and ring E, the ring E will raise up and stop the grain from passing between the ring E and hopper bottom F, thereby preventing the mill from clogging or stopping, by too great a supply of grain.

The diameter of the adjustable hopper bottom F is somewhat larger than the inside diameter of the self-regulating feed ring E, thereby stopping the passage of the grain when the feed ring E, raises, on account of too much grain passing between the feed ring E, and top of upper runner B.

Q represents the outside stationary part of the mill to which the legs, box for shaft L, &c. are attached.

C represents the upper angle of the stationary part of the mill which corresponds to the conical angle of the upper runner B, the dress being cut similar to common mills. The upper runner B, has a motion to the right as indicated by the dart, Fig. 4.

D, represents a different angle in the stationary part of the mill, corresponding to the angle of the lower runner A, which approaches a horizontal line. The lower runner A has a motion to the left as indicated by the dart, Fig. 2. The object of this arrangement in the lower runner A is to facilitate the passage of the grain from the upper runner B, after it is partly ground, thereby giving more surface for it to spread, and the air being introduced from the fans in the upper runner B, through an unbroken space between the upper runner B, and lower runner A prevents the meal or flour from heating, all particles of grain that are not perfectly ground, passing from the upper runner B, are struck by the reverse motion of the lower runner A, and ground to fine even meal or flour. The meal or flour may be drawn more rapidly, from the upper runner B, by increasing the motion of the lower runner A, thereby causing less heat and clogging, as in mills where the grain is retained.

Now I do not claim the reverse motion as used in many mills, wherein the inside cylinder or cone has one motion, and the outside cylinder or shell has a reverse or opposite motion. Nor do I claim the introduction of air into the grain to prevent it from heating, but—

What I do claim as my invention and desire to secure by Letters Patent is—

1. The dividing the runner and reversing the motion of the separate parts as above described.

2. The introduction of air through an unbroken space between the upper runner B, and lower runner A, from the fans N, N, N, N, in the upper runner B, as specified.

3. The selfregulating feed ring and hopper bottom, for regulating the feed of the grain as set forth.

WILLIAM JOSLIN.

Witnesses:
W. THOMPSON,
ROBT. J. RAMEY.